(12) United States Patent
Xu

(10) Patent No.: US 9,795,988 B2
(45) Date of Patent: Oct. 24, 2017

(54) POLYIMIDE COATING METHOD AND DEVICE

(71) Applicant: Shenzhen China Star Optoelectronics Technology Co., Ltd., Shenzhen, Guangdong (CN)

(72) Inventor: Liang Xu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 201 days.

(21) Appl. No.: 14/411,409

(22) PCT Filed: Oct. 29, 2014

(86) PCT No.: PCT/CN2014/089794
§ 371 (c)(1),
(2) Date: Dec. 26, 2014

(87) PCT Pub. No.: WO2016/061834
PCT Pub. Date: Apr. 28, 2016

(65) Prior Publication Data
US 2016/0264457 A1    Sep. 15, 2016

(30) Foreign Application Priority Data
Oct. 20, 2014    (CN) .......................... 2014 1 0558221

(51) Int. Cl.
*B05D 1/02*    (2006.01)
*B05B 13/02*    (2006.01)
*B05B 9/01*    (2006.01)
*C03C 17/28*    (2006.01)
*B05D 1/40*    (2006.01)
(Continued)

(52) U.S. Cl.
CPC .................. *B05D 1/02* (2013.01); *B05B 9/01* (2013.01); *B05B 13/02* (2013.01); *B05B 13/0221* (2013.01); *B05B 13/0278* (2013.01); *B05D 1/40* (2013.01); *C03C 17/28* (2013.01); *C03C 17/32* (2013.01); *G02F 1/1303* (2013.01);
(Continued)

(58) Field of Classification Search
None
See application file for complete search history.

(56) References Cited

U.S. PATENT DOCUMENTS

| 3,235,772 | A | * | 2/1966 | Gurin | ..................... | B41N 10/04 |
| | | | | | | 101/376 |
| 5,151,298 | A | * | 9/1992 | Nammatsu | ........ | G02F 1/133784 |
| | | | | | | 427/359 |
| 2014/0057044 | A1 | * | 2/2014 | Huang | .................. | H05B 33/10 |
| | | | | | | 427/66 |

FOREIGN PATENT DOCUMENTS

CN    102826765 A    * 12/2012    ....... G02F 1/133723

* cited by examiner

*Primary Examiner* — Michael P Rodriguez
(74) *Attorney, Agent, or Firm* — Andrew C. Cheng

(57) ABSTRACT

An embodiment of the present invention discloses a polyimide coating method, which includes the following steps: providing a glass substrate and at least one nozzle; applying the nozzle to a polyimide solution onto the glass substrate to form a polyimide film; and moving the glass substrate to have the glass substrate pass through a roller that includes a printing plate so that the roller that includes the printing plate shapes the polyimide film uniformly distributed on the glass substrate to have a surface of the polyimide film formed on the glass substrate uniform and flat. The present invention also provides a polyimide coating device. The polyimide coating method and device of the present inven- (Continued)

tion shorten coating time of polyimide, increase coating efficiency, and reduce coating cost.

8 Claims, 1 Drawing Sheet

(51) Int. Cl.
*G02F 1/13* (2006.01)
*C03C 17/32* (2006.01)
(52) U.S. Cl.
CPC .... *B05D 2203/35* (2013.01); *C03C 2218/112* (2013.01); *C03C 2218/32* (2013.01)

POLYIMIDE COATING METHOD AND DEVICE

CROSS REFERENCE TO RELATED APPLICATIONS

This application claims the priority of Chinese Patent Application No. 201410558221.0, entitled "Method and Device for Coating Polyimide", filed on Oct. 20, 2014, the disclosure of which is incorporated herein by reference in its entirety.

BACKGROUND OF THE INVENTION

1. Field of the Invention

The present invention relates to the field of liquid crystal displaying, and in particular to a method and a device for coating polyimide.

2. The Related Arts

Liquid crystal displays (LCDs) have a variety of advantages, such as thin device body, low power consumption, and being free of radiation, and are thus of wide applications. Most of the liquid crystal displays that are currently available in the market are backlighting liquid crystal displays, which comprise a liquid crystal display panel and a backlight module. The principle of operation of the liquid crystal display panel is that with liquid crystal molecules interposed between two parallel glass substrates, electricity is applied to the glass substrates to control the liquid crystal molecules to change direction in order to refract out light emitting from the backlight module for generating images.

Generally, the liquid crystal display panel is composed of a color filter (CF) substrate, a thin-film transistor (TFT) substrate, liquid crystal (LC) interposed between the CF substrate and the TFT substrate, and sealant. The liquid crystal display panel often needs to coat polyimide (PI) on the TFT substrate and the CF substrate and to form a pre-tilt angle by subjecting polyimide to rubbing or photolithography in order to provide the liquid crystal molecules with a carrying angle.

Heretofore, coating of polyimide is achieved with the following way. Polyimide is uniformly applied to a printing plate (Asahikasei Photosensitive Resin (APR) plate) and polyimide is transferred by means of a roller from the printing plate to the TFT substrate or the CF substrate with the TFT substrate or the CF substrate being simultaneously moved in plane to complete the coating of polyimide. However, the known devices for coating polyimide are very complicated and the operation time of coating polyimide is extended so that polyimide may readily flow away from opposite sides of the TFT substrate or the CF substrate, resulting in waste of material.

SUMMARY OF THE INVENTION

An embodiment of the present invention provides a method and a device for coating polyimide that shorten coating time of polyimide, increase coating efficiency, and reduce coating cost.

A polyimide coating method comprises the following steps:

providing a glass substrate and at least one nozzle;

applying the nozzle to spray a polyimide solution onto the glass substrate to form a polyimide film; and moving the glass substrate to have the glass substrate pass through a roller that comprises a printing plate so that the roller that comprises the printing plate shapes the polyimide film that is uniformly distributed on the glass substrate to have a surface of the polyimide film formed on the glass substrate uniform and flat.

Further, the number of the nozzle used is at least two and the at least two nozzles are arranged in a row.

Further, the row of the at least two nozzles has a length substantially corresponding to a width of the glass substrate.

Further, the nozzle comprises a circular nozzle.

Further, in applying the nozzles to spray the polyimide solution onto the glass substrate to form the polyimide film, the at least two nozzles are activated or de-activated simultaneously.

Further, the at least two nozzles have identical flow rate.

Further, the printing plate is made of a polybutadiene resin.

Further, the printing plate is made of a fluorine-based material.

A polyimide coating device comprises a conveyance device, a nozzle, and a roller. The conveyance device conveys a glass substrate. The nozzle sprays a polyimide solution onto the glass substrate to form a polyimide film. The roller comprises a printing plate. The roller comprising the printing plate is operable to shape the polyimide film uniformly distributed on the glass substrate.

Further, the printing plate is made of a polybutadiene resin or a fluorine-based material.

The present invention provides a polyimide coating method and device, which shorten coating time of polyimide, increase coating efficiency, and reduces coating cost and which uses at least two nozzles to spray a polyimide solution and moves a substrate so that the polyimide solution is efficiently and uniformly coated on the glass substrate and uses a roller comprising a printing plate to shape the polyimide film uniformly distributed on the glass substrate to have a surface of polyimide film flat so as to obtain bettered result of coating.

BRIEF DESCRIPTION OF THE DRAWINGS

To more clearly explain the technical solution proposed in an embodiment of the present invention and that of the prior art, a brief description of the drawings that are necessary for describing embodiments is given as follows. It is obvious that the drawings that will be described below show only some embodiments. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution of embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
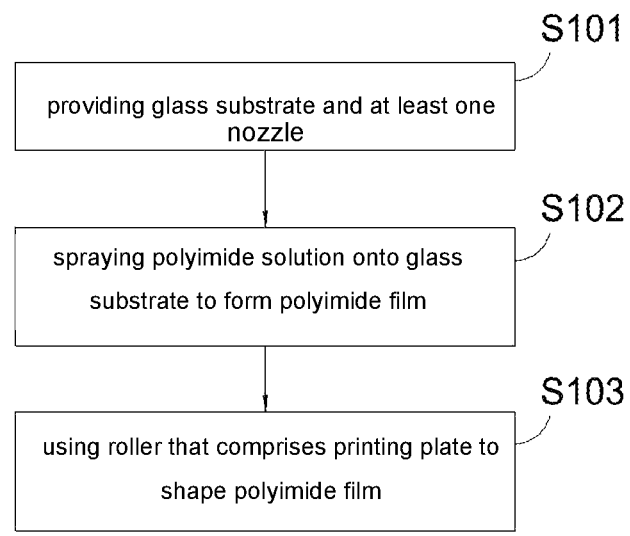
FIG. 1 is a flow chart illustrating a polyimide coating method according to a preferred embodiment of the present invention.
Figure 2:
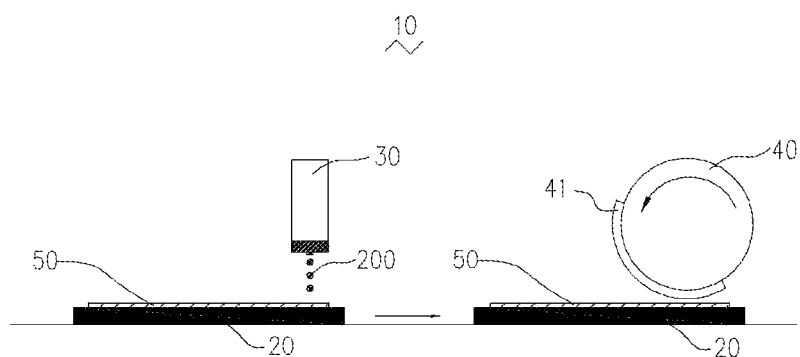
FIG. 2 is a schematic view illustrating the structure of a polyimide coating device according to a preferred embodiment of the present invention.

Referring to FIGS. 1 and 2, the present invention provides a polyimide coating method and a polyimide coating device, which are used to coating polyimide on a substrate of a liquid crystal display panel. In the instant embodiment, the substrate is a glass substrate constituting a thin-film transistor (TFT) substrate or a color filter (CF) substrate.

The polyimide coating device 10 of the present invention comprises a conveyance device 20, nozzles 30, and a roller 40. The conveyance device 20 functions to convey a glass substrate 50. The nozzles 30 function to spray a polyimide solution 200 to the glass substrate 50 to form a polyimide film (not shown). The roller 40 comprises a printing plate 41 mounted thereon. The roller 40 that comprises the printing plate 41 mounted thereon functions to shape the polyimide film that is uniformly distributed on the glass substrate 50. The number of the nozzles 30 used can be at least two. The nozzles 30 and the roller 40 are arranged, in sequence, in a conveyance direction of the conveyance device 20.

The polyimide coating method of the present invention comprises the following:

Step S101: providing a glass substrate 50 and at least one nozzle 30. In this step, the number of the nozzle 30 used can be one or at least two. When the number of the nozzle 30 used is at least two, the at least two nozzles 30 are arranged to line up, in a manner of being closed to and in alignment with each other, to form a row. Preferably, the row of the at least two nozzles 30 has a length that is substantially corresponding to a width of the glass substrate 50. In this step, by arranging the row of the nozzles 30 to have a length corresponding to the width of the glass substrate 50, it is possible to ensure that a polyimide solution 200 can completely drop on the glass substrate 50 without causing incomplete coating or falling outside the glass substrate 50 to result in waste. In this step, the at least two nozzles 30 are suspended vertically above the glass substrate 50 in such a way that outer edges of the entire row of the nozzles 30 are substantially flush with outer edges of the glass substrate 50 to prevent incomplete coating or falling outside the glass substrate 50 to result in waste.

Step S102: applying the nozzle 30 to spray the polyimide solution 200 onto the glass substrate 50 to form a polyimide film. In the instant embodiment, the nozzle 30 can be a circular tubular nozzle 30 or a nozzle 30 of other suitable specifications. The glass substrate 50 is positioned on a belt conveyor so that the glass substrate 50 is movable with respect to the nozzle 30. The moving direction of the glass substrate 50 can be perpendicular to the lined-up direction of at least two nozzles 30. It is appreciated that the glass substrate 50 can be moved in any way within a plane that is perpendicular to the nozzles 30.

In this step, by activating the plurality of nozzles 30 and moving the glass substrate 50, each of the nozzles 30 is allowed to efficiently and uniformly drop the polyimide solution 200 onto the glass substrate 50 according to a pre-set flow rate so as to form the polyimide film.

Preferably, In this step, the at least two nozzles 30 are activated or de-activated simultaneously in order to ensure that the polyimide solution 200 can be uniformly dropped onto the glass substrate 50.

Each of the nozzles 30 has the same flow rate and the flow rate is determined according to the moving speed of the glass substrate 50 and a desired thickness of the polyimide film to be coated. The at least two nozzles 30 are activated or de-activated simultaneously in order to ensure the uniformity of the coating of the polyimide solution 200.

Step S103: moving the glass substrate 50 to have the glass substrate 50 pass through a roller 40 that comprises a printing plate (an APR plate) 41 so that the roller 40 that comprises the printing plate 41 shapes the polyimide film that is uniformly distributed on the glass substrate 50 to have a surface of the polyimide film formed on the glass substrate 50 uniform and flat.

In this step, a pressure induced between the roller 40 and the glass substrate 50 may be controlled so as to have the polyimide solution 200 spread uniformly. The printing plate 41 can be made of a polybutadiene resin or a fluorine-based material so as not to excessively bring away the polyimide solution 200 thereby facilitating the spreading of polyimide. Preferably, the printing plate 41 has a length that is slightly greater than the width of the glass substrate 50 in order to ensure that the surface of the polyimide film is uniform and flat. In this step, the thickness of polyimide on the glass substrate 50 can be controlled by controlling a gap between the printing plate 41 and the glass substrate 50.

The present invention provides a polyimide coating method and device, which shorten coating time of polyimide, increase coating efficiency, and reduces coating cost and which uses at least two nozzles 30 to spray a polyimide solution 200 and moves a substrate so that the polyimide solution 200 is efficiently and uniformly coated on the glass substrate 50 and uses a roller 40 comprising a printing plate 41 to shape the polyimide film uniformly distributed on the glass substrate 50 to have a surface of polyimide film flat so as to obtain bettered result of coating.

Disclosed above is only one preferred embodiment of the present invention, which does not impose undue constraints to the scope of protection of the present invention. Those having ordinary skills of the art may readily appreciate that equivalent modifications that allow for realization of all or part of the operation process of the preferred embodiment described above and comply with the requirement defined in the appended claims are considered within the protection scope covered by the present invention.

The above illustrates the preferred embodiments according to the present invention. However, it is noted that those skilled in the art would appreciate that various improvements and modifications are still available without departing from the scope of the present invention and such improvements and modifications are considered within the scope of protection of the present invention.

What is claimed is:

1. A polyimide coating method, comprising the following steps:
   providing a glass substrate and at least one nozzle;
   applying the nozzle to spray a polyimide solution onto the glass substrate to form a polyimide film; and
   moving the glass substrate to have the glass substrate pass through a roller that comprises an outer circumferential surface on a part of which a printing plate is attached so that the roller that comprises the printing plate shapes the polyimide film that is uniformly distributed on the glass substrate to have a surface of the polyimide film formed on the glass substrate uniform and flat.

2. The polyimide coating method as claimed in claim 1, wherein the number of the nozzle used is at least two and the at least two nozzles are arranged in a row.

3. The polyimide coating method as claimed in claim 2, wherein the row of the at least two nozzles has a length substantially corresponding to a width of the glass substrate.

4. The polyimide coating method as claimed in claim 1, wherein the nozzle comprises a circular nozzle.

5. The polyimide coating method as claimed in claim 2, wherein in applying the nozzles to spray the polyimide solution onto the glass substrate to form the polyimide film, the at least two nozzles are activated or de-activated simultaneously.

6. The polyimide coating method as claimed in claim 5, wherein the at least two nozzles have identical flow rate.

7. The polyimide coating method as claimed in claim 1, wherein the printing plate is made of a polybutadiene resin.

8. The polyimide coating method as claimed in claim 1, wherein the printing plate is made of a fluorine-based material.

\* \* \* \* \*